United States Patent [19]
Hobbensiefken et al.

[11] 3,978,739
[45] Sept. 7, 1976

[54] TRANSMISSION SHIFT CONTROL

[76] Inventors: Dean Hobbensiefken, Rte. 1, Box 241, Lyons, Oreg. 97358; Michael A. Signa, 1204 Hirsch St., Melrose Park, Ill. 60160

[22] Filed: July 23, 1975

[21] Appl. No.: 598,289

[52] U.S. Cl. .............................. 74/473 R; 74/470; 180/77 R; 180/89 A
[51] Int. Cl.[2] .......................................... G05G 9/16
[58] Field of Search ............ 74/470, 473 R; 180/11, 180/14 A, 14 B, 14 D, 77 R, 89 A

[56] References Cited
UNITED STATES PATENTS

| | | | |
|---|---|---|---|
| 2,669,316 | 2/1954 | Schjolin | 74/473 R X |
| 3,329,229 | 7/1967 | Mukho | 180/89 A X |
| 3,476,202 | 11/1969 | Dudley | 180/89 A X |
| 3,732,942 | 5/1973 | Hobbensiefken | 180/11 |

*Primary Examiner*—Allan D. Herrmann
*Attorney, Agent, or Firm*—Watson, Cole, Grindle & Watson

[57] ABSTRACT

Gear shift movements from a main frame are transmitted to a gear transmission shift control, located on a sub-frame pivotally connected to the main frame, by means of a linkage system fixed at one end to the main frame and articulating at its opposite end with the sub-frame about an axis non-coincident with the pivot axis of the frames. The linkage system includes interconnected links, one of which being axially collapsible for transmitting rotational movement regardless of any sub-frame pivoting. The linkage system also includes a resilient cable which spans the collapsible link for transmitting axial movements thereacross.

7 Claims, 5 Drawing Figures

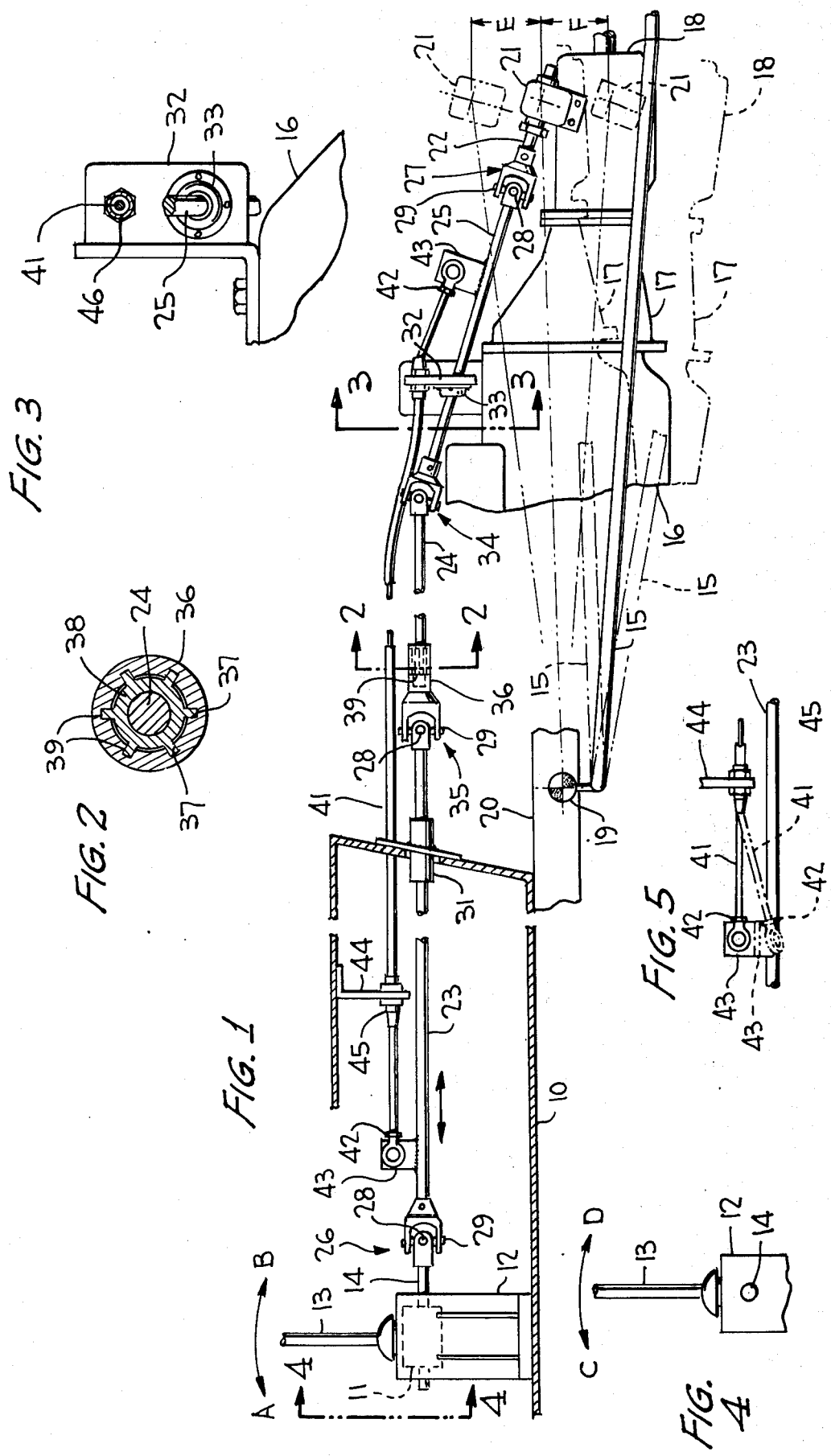

TRANSMISSION SHIFT CONTROL

BACKGROUND OF THE INVENTION

1. Field of the Invention

This invention relates generally to a control mechanism wherein axial and rotary movements are transmitted between articulated frames by means of a shaft system which articulates about an axis not coincident with the pivot axis of the frames. More particularly, the invention relates to a shift control mechanism for a gear transmission wherein the shaft system has a collapsible section with a cable spanning the section, so as to effect transmission of rotary and axial movements between a gear shift actuator on the main frame and a shift control on the subframe.

2. Description of the Prior Art

In a remotely controlled mechanism such as a gear transmission for a motor vehicle, both axial and rotary shifting movements of the gear actuator are transmitted to the shift control of the gear transmission by means of a shift system. Transmission of such motion normally does not present a problem for present motor vehicles including tractor-trailer vehicles which utilize a cab-forward or a high-tilt conventional cab configuration. With such an arrangement, the cab, the cab-mounted shift controls, the transmission and the transmission-mounted shift controls are all attached to the main chassis frame. Some relative articulations occur due to the elastomeric mounting of both the cab and the transmission, although such articulation is relatively insignificant.

The problem in both effectively transmitting axial and rotary movements from the cab-mounted gear actuator to the gear transmission shift control is when the latter is mounted on a sub-frame for pivotal movement relative to the cab-mounted main frame. The shaft system in such an arrangement is therefore fixed at the cab end and articulates at its opposite ends about an axis other than the pivotal axis between the main frame and the sub-frame. Accordingly, any up-and-down movements of the sub-frame relative to the main frame causes changes in the effective length of the shaft between the gear transmission control and the gear actuator.

A solution employed for reducing or eliminating the problem, particularly on tilt-cab trucks, is to so arrange the centerline of the shift lever sphere as to coincide with the tilt axis of the cab. However, such an arrangement requires an extremely complex mechanical linkage which is quite often only reasonably effective.

SUMMARY OF THE INVENTION

It is therefore an object of this invention to provide a shift control mechanism as having a linkage system which effectively and efficiently transmits axial movements as well as radial movements while at the same time permits one of its ends to articulate vertically on an arc which does not have a center coincident with the center of articulation of the linkage system.

Another object of the present invention is to provide such a mechanism wherein the linkage system has a collapsible portion so as to compensate for changes in effective length of the interconnected links, while at the same time being capable of transmitting axial movements by means of a resilient cable fixed thereon.

Other objects, advantages and novel features of the invention will become more apparent from the detailed description of the invention when taken in conjunction with the accompanying drawings.

BRIEF DESCRIPTION OF THE DRAWINGS

FIG. 1 is a side elevational view of the linkage system for the transmission shift control according to the invention, as arranged in a motor vehicle;

FIG. 2 is a sectional view of a linkage coupling taken substantially along line 2—2 of FIG. 1;

FIG. 3 is a view of a rearward link connection to the sub-frame taken substantially along line 3—3 of FIG. 1;

FIG. 4 is a front elevational view of the cab-mounted gear actuator viewing substantially along line 4—4 of FIG. 1; and FIG. 5 is a side elevational view showing the manner in which the cable is allowed angular deflection upon rotational shifting movement of the linkage.

DESCRIPTION OF THE PREFERRED EMBODIMENT

As set forth in U.S. Pat. No. 3,732,942, dated May 15, 1973 and entitled "Removable Vehicle Chassis Sub-Frame with Engine," the engine, transmission, clutch housing and rear axle are mounted to a sub-frame which is pivotally connected to the main chassis frame by a hitch means on the main frame. The sub-frame has a full rear suspension and is capable of pivoting at the hitch means. This, therefore, causes the transmission and the transmission-mounted controls to move up and down in an arc about the point of attachment at the hitch. On the other hand, the gear shift actuator is mounted on the cab which is relatively rigidly mounted to the main frame. Accordingly, as shown in FIG. 1, there is substantial relative motion between the cab mounted portion of the shift controls and the transmission-mounted shift controls. Furthermore, due to the engine position, it is impossible for the linkage between the gear actuator and the transmission shift control to pass through the pivot point of articulation between the main frame and the sub-frame.

FIG. 1 shows in side elevation the complete linkage system of the invention, the cab-mounted gear shift control or actuator, the cab support for the linkage and cable, the cable and linkage mounted on the sub-frame, the transmission-mounted shift control, the pivot point between frames and an approximate articulation of the transmission. A portion of the cab structure is shown at 10, the remaining structure of the vehicle being omitted for the sake of clarity. A gear shift actuator including a shift lever housing or shift tower 11 is rigidly secured to a support member 12 which is itself rigidly mounted on the base of the cab structure. A shift lever 13 of this gear shift actuator is provided in the normal manner for actuation by the driver, and is formed at its lower end with a spherical ball portion mounted in a spherically-shaped seat (not shown) in housing 11 as in any normal manner. Thus, the lever is free to move within its seat in a fore-and-aft direction AB and in a transverse direction CD as shown by the curved arrows in FIGS. 1 and 4. Also, a portion of the shift lever extending outwardly of its spherical ball is linked to a shaft 14 to effect axial movement thereof, as shown by the double headed arrow in FIG. 1, upon lever movement in the A, B direction, and to effect rotational movement of the shaft upon movement of the shift lever in the C, D direction.

A portion of a sub-frame 15, similar to that illustrated in the aforementioned U.S. Pat. No. 3,732,942, is partly shown in FIG. 1 for supporting engine 16, clutch housing 17 and transmission 18 in any normal manner. The sub-frame is mounted to main frame 20 at a hitch point 19 in any normal manner for pivotal movement at such point. The cab is, of course, mounted on the main frame.

A shift tower housing 21 is mounted on the transmission and conventionally houses an interconnected lever and shift tower shaft (not shown) for effecting gear speed changes in the normal manner. The shafts are interconnected with a tower input shaft 22 to effect the gear speed changes in response to the linear and rotational movements of the input shaft.

The linkage system according to the invention basically comprises a forward link 23, an intermediate link 24 and a rearward link 25. When required due to vehicle configuration considerations, link 23 may be coupled to shaft 14 behind the cab-mounted shift controls by means of a coupling 26, and link 25 may be connected to input shaft 22 ahead of the shift tower housing by means of a similar coupling 27. Both these couplings permit pivotal movement about perpendicular axes 28, 29 as in any conventional manner.

Shaft 23 extends outwardly of the cab structure and is mounted thereon for linear and rotary movements by means of a sleeve 31. Link 25 is supported for linear and rotational movements by means of a bracket 32 mounted on engine 16. Shaft 25 extends through a self-aligning linear bearing 33 provided in bracket 32 which permits up and down shifting movement of this link together with the sub-frame in response to vertical movements thereof. Intermediate link 24 is connected to link 25 by means of a coupling 34 which is similar to couplings 26 and 27 and functions in the same manner to permit pivotal movement about perpendicular axes. This coupling is so disposed as to provide engine clearance. Also, intermediate link 24 is connected to link 23 by means of a coupling 35 similar in all respects to coupling 34 except that a sleeve 36 of this coupling surrounds link 24. This sleeve, as shown in FIG. 2, is internally splined in an axial direction as at 37 for engagement with a small sleeve 38 fixedly secured to an end of link 24. This sleeve 38 is externally splined as at 39 shown in FIG. 2 so as to form a linear tongue and groove engagement between sleeves 36 and 38. It should be noted that the end of link 24 and its sleeve 38 terminate as at 39 so as to permit the intermediate link to move inwardly relative to sleeve 36 as well as outwardly relative thereto.

The linkage means or system in accordance with the invention further comprises a jacketed cable 41. Spherical ball joints 42 are fixed at both ends of the cable and are mounted on bracket 43 which are fixedly secured to links 23 and 25 as shown in FIG. 1. At the forward end, the cable is mounted to a portion of the cab structure by means of a bracket 44 which supports jacket 45 of the cable through which the cable extends so that the cable may be axially shifted relative thereto. At the rearward end, the cable extends through its jacket fixedly secured to bracket 32, the cable being linearly movable within its jacket sleeve so as to transmit push and pull between links 23 and 25.

Hitch point 19, the pivot point of articulation between the main frame and the sub-frame, is likewise the pivot point for vertical movements E, F, of transmission shift housing 21. When vertical movement such as E or F occurs, link 24 pivots about axis 28 of coupling 35, so that the angularity between links 23 and 24 changes.

And, since axis 28 of coupling 35 and hitch point 19 are not coincident, vertical movements E or F effect a longitudinal distance change between couplings 26 and 27. It can be therefore seen that, if this change is not compensated for, it would be impossible for the transmission to remain in a selected gear during normal vehicle operation. However, if only this distance change is compensated for, it can be seen that it would be impossible to effectively transmit axial movements along the linkage system thus making it impossible to change transmission speeds. Compensation for such a distance change is therefore made as intermediate link 24 slides inwardly of sleeve 36 whereupon the distance between couplings 34 and 35 decreases. By reason of the splined engagement between the small sleeve 38 on link 24 and the surrounding sleeve 36, no relative rotation between the links 23 and 24 is made possible. Accordingly, rotary motion between shafts 14 and 22 is capable of being transmitted along the linkage system despite the vertical deflections E and F. Also, it should be noted that, during the aforementioned inward sliding movement of link 24 relative to sleeve 36, cable 41 flexes between brackets 44 and 32 so as to permit this compensation for deflection to further take place unimpeded. Such flexing of the cable is permitted to occur because of the flexible character of the cable.

When shift lever 13 is moved fore and aft in the direction A and B, the resistance to movements in the cab-mounted shift tower 11 is overcome by the operator and the linear force required to produce the required linear movements along the linkage system for a change of gears during a deflection of the transmission is transmitted by cable 41. Because of the collapsible or slide coupling 35, it would be impossible for the linkage system, without the use of the cable according to the invention, to transmit such linear force and movements.

When the operator moves the shift lever transversely at a particular angle in the directions C or D as shown in FIG. 4, the interconnected links of the linkage system rotate through a corresponding angle thereby causing an angular deflection of cable 41 as in the manner illustrated in FIG. 5 which shows such a deflection of the cable in an exaggerated form for the purpose of clarity. The cable is designed for angular deflection and does not cause any resistance.

From the foregoing it can be seen that a simple and economical yet highly effective transmission shift control arrangement has been devised to provide compensation for deflection of a sub-frame mounted transmission and its shift housing when such deflection occurs about a pivot point which is not coincident with an axis about which the shift linkage pivots. Transmission of both rotary and axial movements is nevertheless permitted by reason of the collapsible coupling and cable arrangement of the invention. Also, while the invention relates particularly to truck chassis designs, the present arrangement may also be provided for other types of machines of mechanisms.

Obviously, many modifications and variations are made possible in the light of the above teachings. It is therefore to be understood that within the scope of the appended claims the invention may be practiced otherwise than as specifically described.

What is claimed is:

1. In a transmission shift control mechanism wherein a gear shift actuator is mounted on a main frame and a gear transmission for the engine having a shift control is mounted on a sub-frame, hitch means on said main frame for pivotally connecting said sub-frame thereto, linkage means interconnecting said shift actuator with said transmission shift control, means on said shift actuator connected to said linkage means for linearly and rotationally shifting said linkage means to effect a gear shifting of the gear transmission, said linkage means comprising:

a plurality of links interconnected together for articulated movement about an axis not coincident with the pivot axis of said hitch means;

a coupling on one of said links permitting it to linearly collapse and extend but preventing relative rotational movement between opposite ends of said one link; and a resilient cable fixedly secured at opposite ends to a forward and to a rearward one of said links so as to span said coupling;

whereby linear and rotational movements of said gear actuator are transmitted to said transmission shift control through said linkage means during pivotal movement of said subframe at said hitch means, said cable shifting linearly to effect said linear movement of said shifting means across said coupling, and said coupling permitting said links to rotate in response to said rotational movement of said shifting means regardless of any linear movement between said opposite ends of said one link.

2. In the mechanism according to claim 1, wherein said coupling comprises an internally splined sleeve member engaging external splines provided on a portion of said one link.

3. In the mechanism according to claim 1, wherein a first of said links is mounted on said main frame for relative sliding and shifting movements thereto, and a second of said links is mounted on said sub-frame for relative sliding and shifting movements thereto.

4. In the mechanism according to claim 1, wherein means is provided for mounting said cable to said main frame at a spaced distance from a forward end of said cable for relative linear movement to said main frame whereby said cable angularly deflects between its forward end and said mounting means during rotation of said links.

5. In a motor vehicle having a main body frame with a cab mounted thereon, a gear shift actuator operatively mounted in said cab, a gear transmission for the engine having a gear shift control thereon being operatively mounted on a sub-frame, hitch means on said main frame for pivotally connecting said subframe thereto, linkage means interconnecting said gear shift actuator with said gear shift control, said linkage means being spaced from said hitch means and being articulated for movement about an axis not coincident with a pivot axis of the hitch means, said gear shift actuator including means connected to said linkage means for linearly and rotationally shifting said linkage means to effect a gear shifting of said gear transmission, said linkage means comprising:

a plurality of links joined end-to-end for pivotal movement about perpendicular axes;

one of said links having a coupling thereon permitting it to linearly collapse and extend but preventing relative rotational movement between opposite ends of said one link; and a resilient cable secured at opposite ends to a forward and to a rearward one of said links so as to span said coupling;

said forward and rearward links being secured to said main frame and to said sub-frame, respectively, for linear and rotational movements relative thereto;

whereby rotational shifting of said gear actuator is transmitted to said transmission shift control through a corresponding rotation of said links regardless of the pivotal movement of said sub-frame, and linear shifting of said gear actuator is transmitted to said transmission shift control through said cable.

6. In the mechanism according to claim 5, wherein said coupling comprises an internally splined sleeve member engaging external splines provided on a portion of said one link.

7. In the mechanism according to claim 5, wherein means is provided for mounting said cable to said sub-frame at a spaced distance from rearward end of said cable to said sub-frame whereby said cable angularly deflects between its rearward end and said mounting means during rotation of said links.

* * * * *